United States Patent Office 3,525,948
Patented Aug. 25, 1970

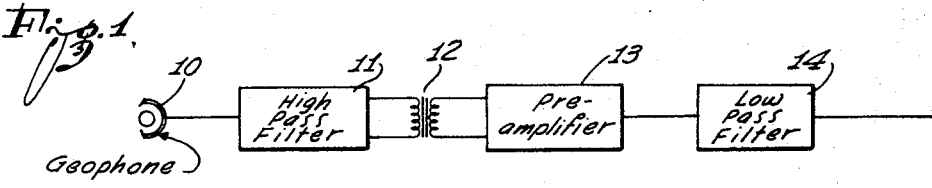
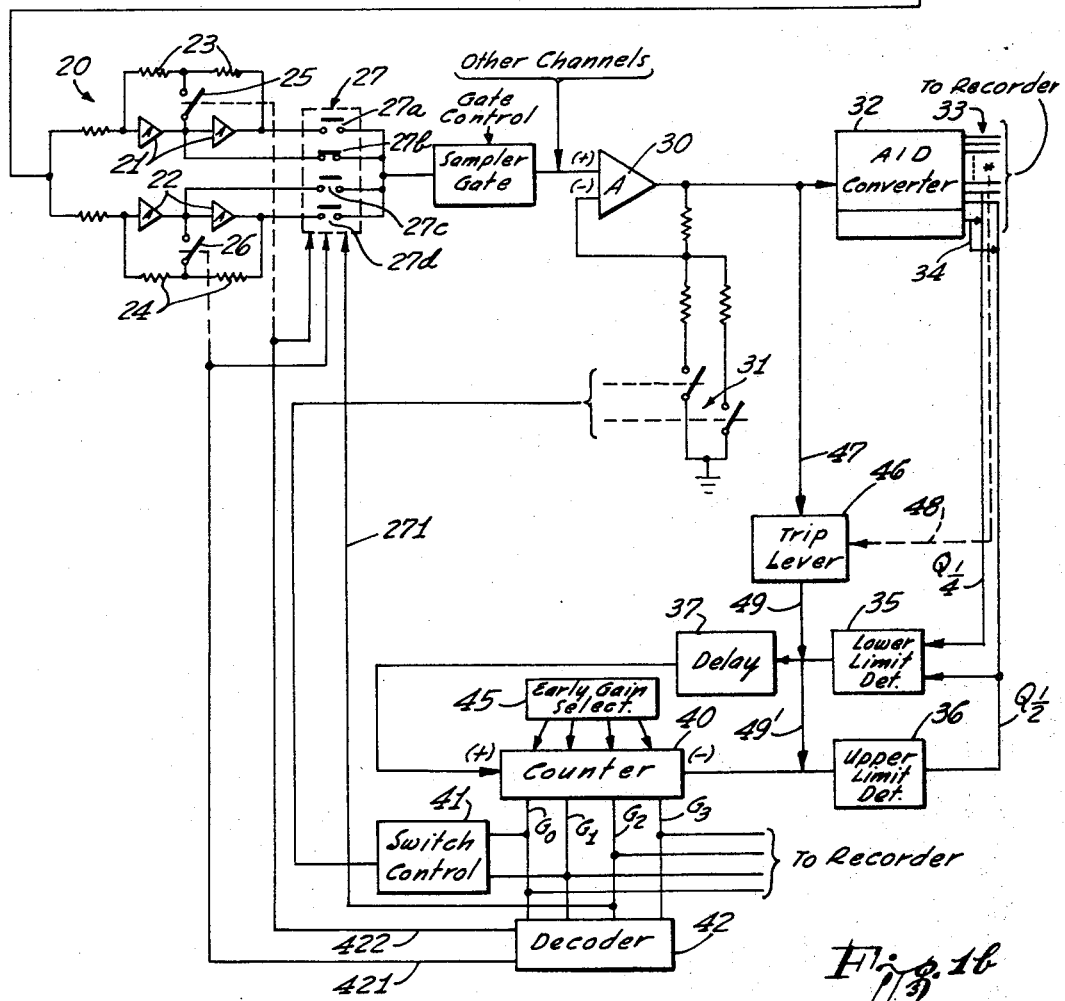
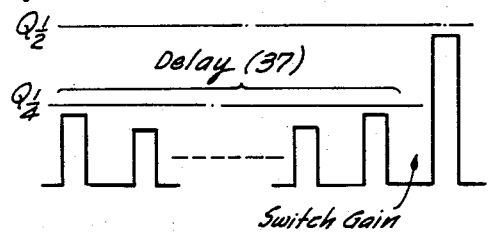

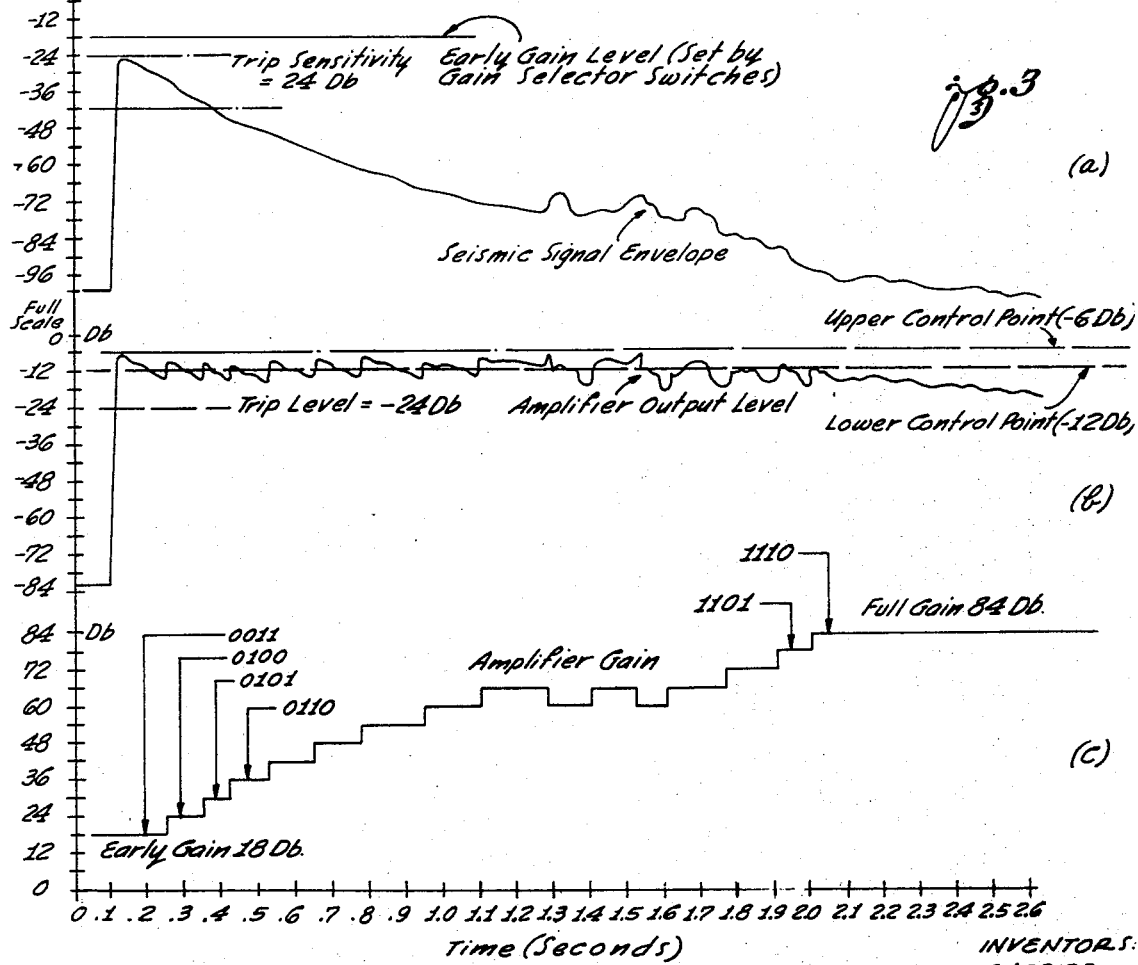

3,525,948
SEISMIC AMPLIFIERS
Paul Sherer, West Covina, and Phillip C. Halverson, Fullerton, Calif., assignors to SDS Data Systems, Inc., Santa Monica, Calif., a corporation of California
Filed Mar. 25, 1966, Ser. No. 537,386
Int. Cl. H03f 1/36, 3/68
U.S. Cl. 330—51                    15 Claims

ABSTRACT OF THE DISCLOSURE

An amplifier system is disclosed in which an amplifier having adjustable gain in relatively small steps can be selectively cascaded with one of two amplifiers having coarse gain adjustment. Coarse gain is adjusted in the off line amplifier.

---

The present invention relates to an amplifier for analog signals having a gain which is adjustable over a wide range of gain levels. More particularly, the invention relates to an amplifier in which the gain is adjustable in the process of digitizing the amplified analog signal. While finding utility beyond the field of processing seismic signals the invention will be explained with reference to geophysical exploration as the preferred field of application.

The purpose of seismic data processing is to extract usable information about underground geological structures from a vast mass of detailed signals and noise. The information is extracted in that in a suitable location a test charge is exploded setting up vibrtaions which travel through the underground. Geophones are placed at different locations, spaced apart from each other as well as from the location of the explosion. The geophones pick up these vibrations and the configuration thereof taken by themselves and in comparison among each other, these signals reveal information regarding the structure of subsurface strata.

The extraction of useful data from these signals has always been a difficult task, and the exploration industry has typically employed the most advanced technology as an aid. In recent years the search for oil has had to penetrate deeper into the earth and to delineate more complex oil trapping structures. Offshore prospecting has introduced additional complications as well as substantially increasing the sheer volume of data recorded.

As a result of all these factors the wanted signal is often small; it may lay even below the noise level. The most effective way to recover these extremely low level signals is by way of mathematical processes in a digital computer. Furthermore, the computer brings great flexibility to the data reduction task. In order to change procedures it is necessary only to revise the computer program; it is not necessary to redesign and rearrange physical hardware. The digital computer unlike analog processing methods can process seismic data with any desired degree of precision, depending on the number of binary bits employed. Consequently, the overall data acquisition and processing system is limited not by the precision of computation but by capability of the analog input amplifiers and/or of the digitizing and recording units.

At the speed required by seismic work, such as a thousand samples per second per measuring channel, modern electronic units are capable of digitizing and recording fifteen bit samples or more if necessary, which is equivalent to 84 db dynamic range. Dynamic range is usually defined as the ratio of the maximum signal handled to the minimum signal distinguishable.

This capability of digital processes points to the seismic amplifier as the limiting element. The present invention now relates to a seismic amplifier or more precisely to an amplifier which finds utility in this field, without degrading the performance of the rest of the system. It can therefore be seen that one of the requirements of such an amplifier should be that it is capable of passing the dynamic range of at least 84 db. If by means of amplifier design additional range could be added to the system, this would be of definite advantage and it is rather easy to adjust a computer, primarily through programming, to the higher degree of accuracy attained therewith. The invention now provides for such an automatic gain ranging amplifier which meets the aforementioned requirements.

The amplifier in accordance with the present invention has therefore the following features. An analog signal is received for example by a geophone or any other suitable source of analog signals. These signals are presumed to vary over a very wide range and they are passed through two cascaded amplifying networks. One of these amplifying networks has adjustable or selectable gain levels which gain levels are apart by the factor 2, from a minimum to a maximum gain level. The gain levels adjustable therewith form the fine scale of gain adjustment steps of the system. The gain is adjusted in this first amplifying network in on-line operation.

The second amplifying network is cascaded with the first one and provides for coarse gain adjustment and is comprised preferably of two parallelly operating amplifiers both receiving the analog signal to be amplified but only one of them at a time is cascaded with the first amplifier for operation. The coarse gain adjustment is carried out in the amplifier of this second network which at any time is not cascaded with the first amplifying network. During operation, the coarse gain of the amplifier system is adjusted by alternating the cascading of the amplifiers in the second network with the first amplifier network.

The analog signal as amplified by the two amplifying networks is fed to a digitalizer or analog-to-digital converter presenting the analog signal in digital format, for example, at a fourteen bit resolution. This number is basically arbitrary and depends entirely on the intended use of the system. In the preferred form the digital signal is presented in binary expansion. The gain level is adjusted in the two amplifier networks in that any gain level change of the smallest order, which of course is carried out in the first amplifier network, corresponds to a multiplication by two or a division by two, as far as the resulting change of the digital output of the analog-to-digital converter is concerned.

The selection of one of fifteen gain levels in the entire system is entirely automatic except for what is called an early gain selecting which will be discussed below. Otherwise the system optimizes gain solely on the basis of the signal amplitude, and thereby eleminating operator judgment in this matter. The output of the cascaded amplifiers ordinarily will be held between one-quarter and one-half of digitizer full output scale. The upper set point is selected so that the seismic signal could double and still remain within the digitizer scale. Thus an input signal burst increasing at a rate of 6 db per millisecond can be digitized and processed. Yet, as the signal peaks gradually fall below the quarter scale as the seismic signal declines, these small signals can be very precisely digitized as 12 out of 14 magnitude bits are still in use at these levels.

In effect the selection of set points strikes the trade-off between the ability to record burst-outs and the ability to resolve signal below the lower set point. The selection of the appropriate gain level is the function of a gain selector and control unit. This unit consists essentially of logic elements which compare the digital output of the digitizer with the upper and lower set points. Additionally the gain selector includes a 4 bit up-down counter which stores a 4 bit binary code number, which in turn controls the gain of the amplifiers.

As the seismic signal decreases and falls below one-quarter scale the counter is incremented up one gain level. If the signal increases and exceeds half scale the counter is decremented by one. The output of the gain selector counter is decoded to control the two parallel operating, coarse gain level adjustable amplifier and the output of the counter further controls the fine gain level adjustable amplifier. In particular, for any required change in gain, the amplifier having adjustable gain in fine steps will be subjected on-line to a controlled change in its gain level. The coarse gain level is controlled also in on-line operation in that the decoded content of the counter alternates the cascading. For particular changes in the counter content the gain level is changed in the respective disconnected coarse adjustable amplifier.

The digitizer output as well as the counter output are recorded, for example, on magnetic tape. For reasons below, each digitizer output number together with the concurring counter content number form a binary floating point number representation of the analog signal.

For seismic operations and others a single channel as it extends from a geophone up to the digital output processer is usually not sufficient. There are several geophones placed in different locations and all are destined to measure the effect of an exploratory detonation. Ultimately the output signal of all the geophones will be processed through a single digital channel. Thus, somewhere along the signal transmission there must be provided a multiplexing network. This leads to the following two aspects. One aspect is that that analog signal for each particular geophone will not be sampled continuously but during the discrete periods of time. Of course the sampling must follow each other at a rate faster than the highest frequency of the information analog signal bearing still useful information and thereby being required to be distinguished and processed.

The other aspect is that it has been found useful to put the multiplexer between the coarse gain adjustable amplifier and the fine gain adjustable amplifier, so that each geophone feeds a signal to its own coarse gain adjustable amplifier network, but the fine gain adjustable amplifier is common to all channels, i.e., it is placed at the output side of the multiplexer. The system may have a large number of geophones, i.e., of analog signal input channels, and it may not be advisable to use the same gain controls unit for all of the channels.

To accommodate variations in field conditions the user may specify the number of gain control units per system. If one unit is used it is responsive to all seismic inputs, when of course the analog signal with the highest input amplitude dictates the gain of all channels. This is called ganged control. If a gain control unit is connected to a group of inputs, say four, then each independently controls the gain of its group. Again the signal with the highest input amplitude sets the gain of all channels within the group. This is called group ganged control. If a gain selector and controls unit is connected to each channel it is responsive only to the amplitude of that channel. This is called individual gain control. For this case, of course, the gain controls units as they are individual for each channel most be multiplexed with the channels. With this arrangement, the gain of the one channel is optimal at all times.

Generally, where prospecting is confined to shallow spreads, interchannel amplitude variations with respect to time will be small and ganged gain control will suffice. Where spreads extend over large distances and interchannel variations are large, such as for example many times in excess of 20 to 30 db with respect to time, it is best to use individual gain. The 4 bit gain code number in the counter of a gain controls unit is recorded on magnetic tape in digital form once for each scan in the case of a ganged gain and once for each sample in the case of group or individual gain.

Another feature of the system is an early gain selector switch which permits the operator to set the initial gain at a low value and hold it there in spite of the fact that with no signal coming in the gain level would automatically cycle up to a high value. The amplifier holds this gain value until the first peak exceeds a trip control sensitivity, which can also be adjusted by the operator and which releases full automatic gain control.

In the case of varying data the signal crosses zero level many times a second. It is apparent that some of the sample values of the signal would fall below the one-quarter scale set point which usually would trigger gain increase. Still, the signal peaks of the same signal train would be above the trigger level and the existing gain level should be continued. A means is needed to delay the gain increase until all samples fall below the trigger level.

In the present system this is accomplished by examining all samples of all channels in a gain group or individually for a period of time which may be adjustable by a release rate switch. The release level rate is an expression of the speed in decibels per second at which the amplifier system is capable of increasing gain to follow a declining seismic signal.

As soon as all samples are below the lower set point for an examination period, the gain is increased to the next level at the next scan. If we assume that for example the gain levels are apart (on the fine scale) by about 6 db, then, with a 30 millisecond examination period, for example, the gain would be increased 6 db every 30 milliseconds or at a rate of 200 db per second. This examination period is an asynchronous sliding window that finds the earliest possible time when the conditions for a gain increase are satisfied.

The system is capable of reducing gain at a very rapid attack rate of 6,000 db per second. If any sample of any channel exceeds the upper scale set point which is one-half of the full scale value of the digitizer output, then the gain is reduced by one step immediately, that is at the next scan. Thus gain reductions can occur at a maximum rate of 6 db each millisecond which may be the length of one scan; this is the equivalent of 6,000 db per second.

As already pointed out in the discussion of quarter and half scale set points, an increasing signal such as a burst-out has a 6 db range on the digitizer output scale available before it would exceed the capacity of the digitizer. Now it may be noticed that the digitizer scale may in effect be doubled in gain in only one single scan of one millisecond. Thus the system is capable of reducing the gain at a dynamic rate of 6,000 db per second which is fast enough to follow nearly any signal.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates somewhat schematically a circuit diagram, primarily as a block diagram, of the preferred embodiment of the present invention;

FIG. 1a illustrates a timing diagram for sample pulses and the effect of a delayed gain increase;

FIG. 1b illustrates a digital representation of the information signal to be recorded;

FIG. 2 illustrates a table showing the relationship between the gain level changes in the amplifiers as shown in FIG. 1 in relation to various controls and other data developed also by and in the circuit as shown in FIG. 1; and FIG. 3 illustrates in three diagrams the processing of an analog signal in the system as shown in FIG. 1.

Proceeding now to the detailed description of the drawings, in FIG. 1 there is shown a source of variable analog signals such as a geophone 10. This geophone 10 may be suitably positioned to pick up shock waves and other seismic data to be processed. An electrical output signal is provided by geophone 10 and is fed to a high-pass filter 11, also called a low cut filter and having a cutoff frequency of, for example, 10 c.p.s. with an 18 db-octave roll off rate. Among other functions the filter 11 prevents long wave type surface waves, also called Rayleigh waves, from entering the system because usually it is desired to examine the configuration of seismic waves which have traveled through deep substrata.

The output signal of filter 11 is passed through a transformer 12 to provide a low noise information signal to a preamplifier 13. Amplifier 13 is a low noise preamplifier with fixed gain. The amplifier isolates the geophone from the succeeding states and circuit elements. The fixed gain of amplifier 13 is selected as a compromise between the maximum peak level desired to be processed and the development of noise by the succeeding stages. A gain of 10 was found to be a suitable compromise, permitting the processing of signals as developed by the geophone in the order of about 1 volt, down to fractions of a microvolt and without introducing excess noise.

The preamplifier 13 is connected to a low-pass filter 14, also called a high cut filter. Since information will be sampled during particular sample periods, the switching frequency of the sampling process must be eliminated. Hence, the filter 14 will have a cut off frequency one-quarter of the switching frequency of the sampling control. The sample period may be about 2 milliseconds, and then the cut off frequency of the filter 14 will be 125 c.p.s.

The output of filter 14 drives a postamplifier network 20 comprising amplifiers 21, and 22 each having two stages connected in series. The two amplifiers 21 and 22 operate in parallel at all times, as they are both connected permanently to the output side of filter 14. The two amplifiers have feedback networks 23 and 24 respectively, which include switches 25 and 26. Thus each amplifier has two selectable gains. Amplifier 21 may have either a gain of 1 or again of 256 ($=2^8$). Amplifier 22 has either a gain of 16 ($=2^4$) or a gain of 4,096 ($=2^{12}$); the gain of the amplifiers is respectively determined by the position of switches 25 and 26. The switches 25 and 26 may pertain to relays, since for them no high speed is required. On the other hand, the on-off states of the switches are such that the rather large differences in gain as resulting from operation of the switches are well defined and little noise is introduced.

The amplifier stages have their output terminals respectively connected to four switches 27a, 27b, 27c and 27d of a control switching device 27. Switch 27 provides a signal path to a sampling gate 28, whereby, of course, only one stage of one of the two amplifiers 21 and 22 is connected to the signal input of sampling gate 28. The system operates on the coarsely adjusted gain level as it exists in the particular amplifier connected to sampling gate 28. The operating gain level of amplifier system can thus have four levels, $2^0$, $2^4$, $2^8$ or $2^{12}$, and for each gain a different one of the four switches 27 is closed. The operating gain is changed during operation by changing the particular one of switches 27 which is closed. The gain level in any of the two amplifiers 21 and 22 is changed only in the particular amplifier disconnected from the sampling gate 28.

The sampling gate 28 has a high speed, a low cross talk and low offset voltage. It may include a transistor switching element wherein the output settles in less than 1 microsecond. Sample gate 28 may be a component of a multiplexing network, and the circuit network connected to the output side of sample gate 28 is common to a plurality of similar channels having a geophone as input source, and all channels have amplifiers such as 13 and 20. Since the signal processing such as recording occurs at a much higher rate than the highest useful information signal frequency, multiplexing is permissible to process signals from the different sources and channels through a single processing channel. In case of multiplexing, gate 28 will receive a gating, sampling or switching signal from a sequencer (not shown) controlling the multiplexing operation. The other channels are being controlled in an analogous manner and in a manner which ensures orderly sequencing.

The output of gate 28 (and of the other gates in case of multiplexing) is connected to a common buffer amplifier 30. The buffer amplifier 30 has two stages and a feedback network for providing adjustable gain. In particular, the amplifier 30 has a fine gain adjustment circuit operated by control switches 31. These switches are transistors as high speed operation is essential here. By operation of the two switches 31, a gain of 1, 2, 4 or 8 can be selected for amplifier 30. The control of switches 31 will be described more fully below.

The output of amplifier 30 is fed to an analog-to-digital converter, in the following called A–D converter 32 for digitizing the analog signal it receives. The digital signal appears in binary expansion and in a parallel-by-bit format in output channels 33. The digital signal also includes a sign bit in a sign bit channel 34. The number of bits, i.e., the number of channels is one of the factors which determines the resolution of the information, but is of no immediate concern for the principle of the invention. An example will be given below.

Analog-to-digital converters usually operate in that within a particular range of the analog input signal, such as, for example, a voltage, they provide a digital signal. The input signal is said to have full scale value, if, for positive sign, all digital output channels have "one" bits, and the corresponding digital signal represents that analog signal with an error, in that it is too small by the incremental analog value corresponding to the least significant bit. Accordingly for an input signal of half-scale value, the resulting digital output signal has a "one" bit (for positive sign) in the most significant bit channel and "zero" bits in all less significant bit positions and channels. For an input analog signal of quarter scale value the second most significant bit will be a "one" and the most significant bit as well as all other bits will be "zeros."

The absolute scale value of such a signal is basically arbitrary but once selected it must be consistent. In other words, we are not concerned here with any particular calibration problem for resolving the vibration amplitudes as measured by the geophone. We are concerned here only with the relative magnitude of a signal in relation to preceding and succeeding signals of the same signal train and in relation to signals picked up by other geophones.

Thus, we may select an analog signal having a full scale value as unit for a digital signal. Full scale value may, for example, be established when the geophone produces a signal of one volt so that amplifier 13 provides 10 volts. If we assume further that switches 25 and 27 are adjusted so that amplifier 21 has gain 1 and is connected to gate 28, and that switches 31 are adjusted so that amplifier 30 has gain 1, then the digitizer 32 will receive full scale value representative of unity of the digital signal. The digitizer cannot provide this digital signal as it exceeds its capacity by an analog increment corresponding to the lowest bit value. It thus follows that any digital signal as correctly provided by the A–D converter 32 has a fraction point to the left of the most significant bit, and is thus a number which can be written as:

$$\cdot Q_{1/2}, Q_{1/4}, Q_{1/8}, \ldots Q_{1/2^n}$$

whereby $n$ is the number of digital channels, and Q denotes the several bits of descending significance from left to right.

This digital signal, however, has meaning only in this form as long as the gain in the entire circuit between geophone 10 and the A–D converter 32 does not change, and only then can the digital number as presented in channel 33 be regarded as describing completely the value of the information signal.

Assuming now that for the same analog signal as provided by geophone 10 switches 31 are readjusted to provide gain 2, then the value of the analog signal at the input side of converter 32 will double and the bits in channel 33 will appear as being shifted to the left by one bit position. This digital signal will not completely describe the input signal any more, but an indication is needed that the position values of the output channels 33 have been changed. In order to provide for a digital signal which is comparable with the one produced at gain 1, the digital signal produced for gain 2 must be divided by 2, i.e., an indication for that gain value 2 is needed to accompany the digital signal as produced with the gain 2, so as to render the signal meaningfully comparable with the digital signal produced when the gain was 1.

It can readily be seen that now for a gain, say $2^m$ (still considered the same input at geophone 10), the resulting digital signal must be associated with, i.e., divided by the factor $2^{m-1}$ in order to be meaningfully comparable with the digital signal produced at gain 1. It follows that any digital signal which is provided in digital channel 33 is incomplete with regard to its representing an analog measuring signal; one needs additionally the particular gain level in the analog channels 20–28–30, in order to render the several signals produced at different gain levels comparable.

In view of the gains as selected it can be seen that the amplifier network 20 provides for coarse gain levels 1, $2^4$, $2^8$, and $2^{12}$; amplifier 30 provides for fine gain levels 1, $2^2$ and $2^3$. Inasmuch as the overall gain of amplifiers 20 and 30 together is a product of the individual gains, it can be seen that selective switching permits adjustment of gains from unit $y$ ($=2^0$) up to $2^{15}$, on a continuous binary scale. The exponent of the power of 2 expresses the presently existing gain in the system and is called the gain code. This gain code can be a number between 0 and 15 (decimal), but the gain code can itself also be expressed in binary expansion, using four bits. Thus the gain code will be a binary number in a range from 0000 to 1111, inclusive. This gain code is given by bits which in the following will be denoted as $G_3$, $G_2$, $G_1$, $G_0$, the subscripts representing the order of significance.

Thus, the digital signal representing an analog measuring signal at any instant is completely described by the following expression:

$$S \cdot Q_{1/2} \, Q_{1/4} \, Q_{1/8} \, \ldots \, Q_{1/2^n} \times 2^{-G_3 G_2 G_1 G_0}$$

This is a binary floating point representation of the measuring signal wherein S is a sign bit, Q is a mantissa bit, and G is an exponent and gain code bit.

The negative sign bit of the exponent results from these considerations: The higher gain, the lower the signal. An increase in gain operates as a multiplication of the input signal relative to the amplified analog signal for an amplifier gain of one. Thus, the digital output must be divided by the gain value as selected for placing the signals in a comparative level.

The table of FIG. 2 now shows in the first column the gain levels, identified by number, just in a natural order. The second column shows the corresponding gain code. The third, fifth and sixth columns show the gain levels respectively in amplifiers 30, 21 and 22. The fourth column shows which one of the two amplifiers 21 and 22 is cascaded with amplifier 30 by means of the four switches 27a, 27b, 27c or 27d, with the closed one being listed for the several gain levels. The last two columns respectively show the resulting gain, as gain factors as well as in decibels. The system can actually identify sixteen gain levels, but as shown in the last line, the last one is not used in the particular environment in which the preferred embodiment of the invention is practiced.

The system as described thus far provided only for the mantissa and sign bits. We now must find and provide in the system a representation of the gain code bits, and we therefore turn to the description of the gain control unit which presents gain code signals and establishes automatically the gain as required and identified by the gain code so that all signals to be processed can be expressed as binary floating point numbers.

The gain control unit establishes for each particular input signal or series of analog input signals a particular gain, so that the input signals can be represented in digital form with the highest number of bits available so as to use the resolution capabilities of the system to the fullest. Also as the system operates with a particular gain it must be prevented that any input signal rises unduly high, because at the full scale value and higher at the input side of the A–D converter 32, the converter is unable to produce the necessary highest order digital bit.

The gain code is now presented by a counter 40 having four stages to form a binary counter. The state of each stage represents one of the gain code bits G. As denoted schematically, there are four output channels for providing the gain code bits $G_0$, $G_1$, $G_2$ and $G_3$. These bits control the state of switches 25, 26, 27, and 31 so as to establish the corresponding gain of the amplifier systems 20, 30. The table of FIG. 2 illustrates the mode of control.

The low order bits of the gain code $G_0$ and $G_1$, control the two switches 31 through a control device 41 to provide the fine gain adjustments in amplifier 30. The gain in amplifier 30 can be one of the values 1, 2, 4, 8. These gain values are established by selective opening and closing of the two switches 31, because they define altogether four switching positions. The details of this control are conventional and it will be appreciated that the control device 41 merely opens and closes switches 31 depending on the subcode expressible by the two low order bits $G_0$ and $G_1$. The four gains are represented by the subcodes 00, 01, 10, 11, and control device 41 controls switches 31 accordingly to respectively establish in amplifier 30 gain values 1, 2, 4 or 8.

As can be seen further from the second and fourth column of the table in FIG. 2, the value of bit $G_2$ determines whether one of the switches 27a, 27b ($G_2=0$) or one of the switches 27c, 27d ($G_2=1$) is to be closed. The respective existing states of switch 25 or 26 particularizes the choice. For $G_2=0$ and open switch 25, switch 27a will be closed, while for closed switch 25, switch 27b will be closed. For bit value "one" of bit $G_2$ with switch 26 being open, switch 27c will be closed, but when switch 26 is closed, switch 27d will be closed. Thus, as representatively illustrated with a command line 271, the bit $G_2$ may control directly the position of switching device 27, whereby, however, the choice between switches 27a and 27b or between 27c and 27d depends on the gain to which the amplifier about to be connected has been adjusted previously. Switching thus occurs for gain level changes 3↔4, 7↔8, and 11↔12. This control by switching on line effects the coarse gain of the system directly. The amplifiers 21 and 22 never have the same gain because their gain levels are interleafed, so that any switching operation by means of switches 27 necessarily changes the gain in the entire amplifier system.

If we speak of a direct control of switches 27 by bit $G_2$, it is of course understood that these will be high speed semi-conductor devices energized and deenergized in accordance with the current flow in the line providing bit $G_2$ and in dependence upon signals in lines 421 and 422.

The control of switches 25 and 26 does not follow a symmetrical code pattern because gain increases are controlled slower than gain decreases as will be explained more fully below. All gain code bits are needed for the operation of gain code decoder 42. Decoder 42 has two output lines 421 and 422, respectively controlling switches 25 and 26 in accordance with the following pattern: For gain codes below seven (0111) amplifier 21 has to have gain 1 and switch 25 is closed. For gain codes of seven and higher switch 25 is open to provide a gain 256. For gain codes below eleven (1011) switch 26 is closed and amplifier 22 has gain 16; for gain codes eleven and higher switch 26 is open and amplifier 22 has gain 4096.

It is significant that the gains are changed in the amplifiers 21 or 22 only when disconnected from sample gate 28. It can be seen, however, that the gain is changed in the respectively disconnected amplifier at level changes asymmetrically related to level changes which accompany change in the amplifier connected by operation of the switching device 27. The reason for this will be explained more fully below.

In summary, the content of register counter 40 determines the gain which is effective in any instant and thus the number presented by register counter 40 is the above identified gain code which can be used to supplement the digital information provided by channel 33 for defining the exponent of the floating representation of the input signal.

Next, it will be described how the information signal is being used to control the gain code. The basic control concept is to provide optimum use of the capabilities of the digitizer without exceeding its range and for maximum resolution. This is established as follows: When the analog signal input for the D-A converter 32 exceeds the half scale value, the gain is reduced to the next lower gain level. When the analog value drops below the quarter scale value, the gain is increased to the next higher gain level. Of course, the gain increase corresponds to a multiplication of the digital output by 2, i.e., shift to the left. The gain increase corresponds to a division by 2 or a shift to the right.

The gain changes are accomplished by incrementing and decrementing the gain code number held in counter 40.

A one bit in the $Q_{1/2}$ bit channel of digital output channels 33 for positive signal represent an analog signal component equal to half scale value and thus can be used to control the counter 40 by causing subtraction of a "one" from the counter content. Zero bits in both the $Q_{1/2}$ and $Q_{1/4}$ bit channels represent dropping of the analog input signal for the converter 32 below the quarter scale value, and this condition controls the adding of a "one" to the gain code number in counter 40.

A detector 36 directly detects a "one" bit in the line $Q_{1/2}$ and feeds a signal to the subtract or decrementing input for counter 40. However, it will be understood that the gain is not changed during a sample period. The same gating signal which opens gate 28 may trigger the counter 40 at the trailing edge of the signal, to decrement the counter if the analog signal as sampled exceeded the half scale value at the upper set point.

The new, lower gain is then available for the next sampling period. For group gain control this next sampling period may be provided for sampling of another geophone output signal and directly succeeding the instant one. In case of strictly single channel operation, with or without multiplexing involved, the gain change will be effective only when the same channel is sampled during its next sample period. In any event, as the analog signal increases above the upper limit value or set point, the gain is adjusted promptly as far as this particular channel or others are concerned.

The situation is different when the analog signal tends to drop. This signal drop may occur for reasons of a signal approach to a zero crossing, so that an increase in gain would be undesirable. First, of course, detector 35 monitors zero bits in the $Q_{1/2}$ and $Q_{1/4}$ bit channels to search for the condition that the lower limit has been exceeded in downward direction. The resulting output signal of the limit detector 35 is not used immediately and directly, but it triggers, i.e., starts a delay device 37.

Delay device 37 may include a reset integrator with threshold behavior at the output in order to provide an output signal only if the reset integrator was allowed to run for a preferably adjustable period of time. Thus, device 37 produces an output signal only if the detector output is sustained at least for the delay period for device 37. This delay period may be adjusted to exceed half the oscillation period for the longest wave to be detected. The delay device will thus be adjusted to half the period of the cut off frequency of high-pass filter 11. A gain increase is in order only when the signal drop has thus been identified as not belonging to a zero crossing. The output of delay device 37 increments the counter 40 by one.

The advanced gain ranging amplifier as described meets the needs for geophysicists for wide dynamic range automatic gain selection and recording. At any instant, the gain code counter identifies one out of fifteen gain levels and sets the gain in the amplifier networks 20 and 30 accordingly. The resulting analog signal is digitized to provide normally thirteen digits. Should the digit signal drop to twelve digits or below, then the gain code is increased, should the digital signal extend to fourteen digits, then the gain code is decreased. The signal as it can be processed digitally, including for example recording of digital signals, will for each analog value comprise of the output of digitizer 32 and of the adjusted gain code as held in counter 40.

In order to understand the full resolution capabilities of this amplifier, consider the following details. The two cascaded amplifiers or amplifier networks 20 and 30 supply half of the total resolution. The lowest gain has been taken as 1, and each succeeding gain level doubles that value, i.e., it goes up the scale 2, 4, 8, etc. Should the system provide for altogether fifteen gain levels then the highest gain will be 16,384. In other words the static range of the amplifier is doubled automatically fourteen times to accommodate the declining seismic input signal. Its lowest range is considered to be a resolution of 1 and the highest range representative of a resolution of 16,384. In effect the gain level as set by the gain selector counter 40 and interpreted as a code reporting the gain level in use, also indicates the resolution as achieved by the amplifier.

The digitizer 32 supplies the other half of the total resolution obtained by the system. The output signal produced by the amplifiers for any one of the amplifier ranges is applied to the digitizer and is separated therein into $16,384(=2^{14})$ distinct amplitude levels, because the digitizer has a fourteen bit output circuit. Accordingly this is the resolution of the 14 bit plus sign bit analog-to-digital conversion output. In the binary number system each bit added after the first one doubles the resolution. Thus, the resolving power of the amplifier-digitizer combination is 1 part in $2^{28}$ or 1 part in 268,435,456.

The system can operate in the following dynamic range. As stated above, dynamic range is the ratio of the maximum signal handled to the minimum signal distinguishable. By using the following relationship the dynamic range of the smallest order in the system can be expressed in decibels:

$$20 \log_{10} \frac{\text{maximum signal}}{\text{minimum signal}} = 20 \log 2 = 20 \times 0.301 \approx 6 \text{ db}$$

The system now provides for an enlargement and selection of the dynamic range in increments of 6 db. Each time the gain level is doubled or each time a bit is added in the digitizer the binary resolution is doubled, the dynamic range is increased by 6 db. With fourteen gain changes, the amplifier resolution may be expressed as 84 db. Similarly, fourteen binary bits after the first one are also equivalent to 84 db. Together with the amplifier and digitizer, the dynamic range derived from the resolution figures is 168 db. On the basis of analog experience this figure may seem unrealistically high. However, the following will show that this figure is meaningful.

The maximum output signal of the geophone is one volt. The noise sets the lower distinguishing level in analog work. This noise is specified to be typically about .1 microvolt RMS. This ratio is $10^7$ or 140 db. Maximum noise is specified to be .2 microvolt RMS. On this noise basis the dynamic range would be reduced to 134 db. The calculation for the dynamic range for the digital recording is made at the digitizer. Following the digitizer the signal is in digital form and noise can no longer degrade it. The preamplifier 13 has a gain of 10 so that for a one volt maximum output of the geophone, the preamplifier 13 produces 10 volts. Since the lowest gain of the amplifier system 20–30 is unity, 10 volts has been selected as the full scale input for the digitizer. Due to the automatic gain range control, full scale input of the digitizer is always 10 volts regardless of the amplifier level in use.

The noise at the analog input to the analog-to-digital converter 32 is composed of two components. One component is the output noise of the entire amplifier system which increases as gain is increased. On the lowest gain level with a gain of 10 (if preamplifier 13 is included in the consideration) the input noise of .1 microvolt multiplied by the gain gives an output noise of 1 microvolt. To this must be added a small amount of referred to output noise on the order of 100 microvolts. Thus the total noise at the input of the digitizer is approximately 101 microvolts. As the gain increases such referred to output noise becomes unimportant relative to the amplifier input noise. Thus at the highest gain level having a gain of 163,840 ($=10 \times 2^{14}$), the noise at the output of the amplifier is approximately 16,484 microvolt RMS.

The second noise component in the system results from the analog multiplexer (sample gate 28) up through the analog input portion of the analog-to-digital converter 32. This noise is specified as .03% of full scale peak to peak or .001 volt RMS. This noise remains the same regardless of the amplifier level in use. The total noise up to the point of digitization is the root mean square sum of the amplifier noise and the system noise. At the lowest gain level, the amplifier noise (101 microvolts) is negligible compared to the system noise which is about 1,000 microvolts, and the RMS combination is still for practical purposes about 1,000 microvolts. At this low gain level the ratio of full scale, i.e., 10 volts to noise of .001 volt is 80 db.

As each gain level is calculated it is found that amplifier noise remains negligible compared with system noise at the gain level 10 which is for a gain of $10 \times 2^{10} \approx 10^4$. In the higher gain levels the amplifier noise after amplification becomes significant in relation to the system noise, and the dynamic range at the digitizer falls off. In the worst case at the highest gain level when the seismic input signal has fallen below 61 microvolts the system dynamic range is 140 db.

The dynamic range at digitizer calculated from noise levels is from 4 to 28 db. less than the digital resolution expressed in decibels. Each 6 db. of dynamic range below the resolution represents a loss of one bit of resolution. For example, on the gain level zero which is a gain of 10, the last bit of fifteen bits is below the RMS noise level. At gain level 12 the last three bits are lost and at gain level 14 more than four bits are below the RMS noise level.

In most applications, digitizing below the system noise level would be of little value. In the seismic application, however, the additional resolution capability is valuable. The reason is that computer procedures such as filtering, cross correlation and convolution can retrieve data from noise. Stacking procedures too can attenuate the noise in relation to the wanted signal. There are reports of data being extracted from noise as much as 35 db greater than the data.

In order for noise removal procedures to function effectively, the digital resolution capability actually must extend below the noise level. As computer procedure are improved and become more widely used, a 14 bit + sign bit resolution will become more and more useful. Thus, what was mentioned originally as unrealistically high as far as the resolving power of the system is concerned, it is quite clear that the full range attainable with this system is realistic indeed and of great value.

The gain control circuit will be as illustrated if there is no multiplexing, or if the gain control unit is common to all channels, so that control device 41, decoder 42 and control line 271 control also the postamplifiers in the other analog signal channels.

For systems having individual gain control units for each analog signal channel, it has to be observed, that the gain controls unit of a non-operating channel must be disconnected from the digitizer. Thus, multiplexer gates similar to the sample gate must be interposed between the output of digitizer 32 and the respective gain code counter 40 of the controls unit for that analog signal channel. For such individual gain controls unit, the detector 35 in cooperation with delay device 37 must overbridge the periods of disablement, because operative disconnection of the gain controls must not be interpreted as a dropping of the signal below the set point. Conventional means can be used here, so that delay device 37 can start to run or can be reset only during respective sample periods, this being only a matter of suitable control from the multiplexer control signal operating as sampling signal for gate 28.

The system as described will operate satisfactorily when measuring has already begun and when signals are received by the geophone, or by the several geophones for a multiplexed system. However, it has to be observed that prior to this normal mode of operation the geophone or geophones are placed in position and the device is turned on to establish a state of expectancy. Then the charge is detonated and in due time the geophones will pick up signals. Thus, the receiving device must be in the ready state during an initial period prior to the arrival of the first signal and zero signal or just noise is picked up by the geophone.

As the level of the spurious signals and of noise is quite low, the system would automatically begin to adjust the gain level up to the highest level it can reach. On the other hand the first seismic signals expected to be received will in the usual case have the maximum amplitude of the run thus requiring a rather low gain level, possibly even the lowest gain level at the beginning of the run.

As was explained earlier in this specification, a reduction in gain is delayed, step by step, in order to search for zero crossings where the current gain level is to be maintained. Thus a gain adjustment from the highest gain level as it may exist for the noise as an input signal, down to the lowest gain level commensurate with an initial burst would to some extent be lost as it would take many sample steps before the gain is effectively reduced.

In order to establish more suitable initial conditions, there is provided an early gain selector 45. This gain selector 45 is in effect a switch which can preset and reset states of all the four stages of counter 40 to any particular desirable value. Thus, the switch 45 provides for an initial gain code operating as control signal for establishing the early gain level in the amplifiers. If the device is used by an experienced operator he will adjust the early gain to such a level as he expects the initial peak to reach.

Additionally and for the initial period of expectancy it is necessary to override the automatic gain control so that the system is maintained in the state of expectancy at the early gain as selected by the selector switch 45. Hence there is provided a trip control device 46 which initially blocks the outputs of detectors 35 and 36 so that they are unable to control incrementing and decrementing of counter 40.

The input side of the trip level control device 46 may be connected either through channel 47 to the output of the amplifier 30 which is the input side of the A–D converter 32, or through channel 48 to particular digit channels 33. Additionally the control device 46 may be adjustable as to the trip level.

As long as the signal received by trip level control device 46 is below an adjusted level, the output sides of detectors 35 and 36 are blocked through channels 49 and 49′ respectively. After the input signal has exceeded the trip level, these blocking signals are removed and then the automatic gain control device can proceed to operate. Of course, the trip device should not operate after automatic gain range control has begun, because during a run the trip control should not interfere with the gain range control.

Trip level control 46 and early gain selection may be common to all analog channels, or they may be individual to each channel.

It will be appreciated that the signals for incrementing or decrementing the counter 40 do not have to be derived from the digitizer output, but one can use the analog input thereof. For decrementing the counter 40 the limit detector will be then a threshold switch responding to an analog signal in excess of a preset value, and for incrementing the count the other limit detector will be a threshold switch responding to dropping of the analog signal below a second preset value. In either case the signal as it will ultimately be effective in the digit channel 33 is retained between the limits which are apart by a gain factor equal to the fine gain adjustment step which is 6 decibels. The gain levels are changed if amplified analog signals of a run differ by more than 6 db in one direction or the other.

Since coarse gain changes are controlled only in an amplifier when disconnected from the digitizer no switching noise is introduced into the system for coarse gain level changes in the amplifiers 21 and 22. There is sufficient time for the output of these post amplifiers to settle after having been subjected to a gain change. As was stated above, the gain changes in the disconnected postamplifier are not made in symmetrical relationship with regard to a range of four gain levels for which a postamplifier remains disconnected (see FIG. 2). Consider, for example, the amplifier 21. The amplifier is disconnected for gain levels 4, 5, 6 and 7 and the gain is changed in amplifier 21, for example, between gain levels 6 and 7. We shall now describe the reason for this asymmetry.

A delay in gain level changes is introduced only for gain increases, but not for gain decreases. Thus, different periods of time are required to make, for example, four sequential gain level changes. Consider at first the case of a rather high increase in amplitude, for example, covering a range in excess of 24 db. This requires a reduction of the gain by four gain levels. We assume further that the system operates at gain level 7 at the time this increase occurs, which is a gain of 128 (total gain of 1280).

For gain level 7, i.e., also at the time the amplitude begins to rise rather steeply, amplifier 21 is the operating amplifier in the amplifying network 20. It will thus take four sample cycles before the appropriate gain level, which may be gain level 3, has been reached. If we assume a sample rate of 1 kc., the gain will be readjusted once every millisecond. A four level gain change will thus take four milliseconds. This corresponds to a dynamic rate of $6 \times 10^3$ db/sec., which is appropriate as faster changes in signal amplitude are rarely expected to occur.

Pursuant to this gain range control there was a sequence of gain changes, from a gain level 7 to 6, to 5, to 4, and finally to gain level 3. At the changeover from 7 to 6 the gain is changed in the disconnected postamplifier 21. Of course this change is not immediately effective in the transmission line for the analog signal as the operating amplifier 21. Thus, amplifier 21 has the additional time it takes the system gain to change from level 6 to 5 and from 5 to 4, for settling its output which is a total of 3 milliseconds. Thereafter and when the level changes from 4 to 3, amplifier 21 will be inserted completely into the analog information transmission line, and the transients resulting from the previous gain changes will have decayed.

Now consider the opposite case, and it even be a smaller and thus conceivably faster occurring change in signal level, say a drop for about 12 db. It is further assumed that the system operates at gain level 6 when the drop occurs. As the gain level is changed from 6 to 7 the disconnected amplifier 21 changes its gain. Another change in gain level cannot occur after just one other sampling cycle, but the delay device 37 first monitors whether or not the signal drop is due to a zero crossing or is a real one. This "release window" lasts for 30 or even 50 milliseconds. Thus amplifier 21 can settle for the period of the delay introduced by device 37 before permitting any increase in gain. The system follows a signal drop at a release rate of 200 db/sec. for a 30 ms. release rate. A run will usually last several seconds, and the system as described covers a total range of 168 db. Thus, the release rate amply suffices for the usual conditions.

FIG. 3 illustrates an example of a seismic run. FIG. 3a shows the envelope of an output signal for the geophone. Time zero is the instant of exploding the exploratory charge. The output of the geophone will thus be at the response level for noise which is over 100 db down from maximum output of the geophone. These conditions are maintained for a period depending upon the distance of the geophone from the explosion. As shown here, this delay is about 3/10 of a second. This early gain level was adjusted to 18 db down from the maximum amplitude signal meaningful detectable with the geophone. The trip level was adjusted to 24 db down from the early gain level.

Thus, the early gain was adjusted so that the signal as expected will be placed directly or at least approximately into the proper gain range, which is approximately gain level 3. From there the device proceeds to adjust the gain automatically. In most cases gain is increased as the signal decays slowly and over a 3 second period as illustrated. By operation of the gain control the analog signal is transformed to assume a configuration as shown in FIG. 3b.

It should also be noted that if the setting of the early gain is one gain level, i.e., 6 db short of the expected amplitude, this can be tolerated because then the gain is controlled in the down direction. The trip sensitivity which is common to all channels is expressed in decibels below the early gain level. The trip sensitivity is as stated set at 24 db at the input level at which the trip occurs is —40 db below the 1 volt level of geophone output. The combination of early gain and trip sensitivity should always be great enough to assure that gain control will commence at the early signal.

After the seismic signal level exceeds the trip level, gain control becomes active and attempts to maintain the digitizer level between one-half scale and one-quarter scale corresponding to an upper control level of —6 db and a lower control level of —12 db as shown in FIG. 3c. As it can be seen, the digital signal to be recorded has 12 or more digits throughout most of the run and until the final adjusted gain has been reached.

Examples of —6 db gain reductions may be seen at approximately 1.3 or 1.5 second in the figure. These are examples of a 6,000 db-second attack rate. Examples of gain increases requiring a sliding window may be viewed at .25 and .35 second. When the gain reaches the final level of 84 db the automatic gain control no longer functions. The signal declining thereafter continues to fall after passing the quarter scale control point as illustrated, about 2 seconds after the run began.

The digital value of the signal as it appears subsequent to tripping and as plotted in FIG. 3b is recorded. The second information needed for recording is the gain code representing gain levels which are plotted as step function in FIG. 3c, and the gain code for some values is written in binary expansion next to several of the gain levels.

The invention is not limited to the embodiment described above but all changes and modifications thereof not constituting departures from the spirit and scope of the invention are intended to be included.

What is claimed is:

1. In an amplifier system the combination comprising:
   digitizing means for converting an analog signal into a digital signal corresponding to a mantissa of a floating point number representation having also a base and an exponent;
   means for providing a code signal defining the exponent of said floating point number, the exponent having a plurality of digits of different significance;
   first amplifier means connected to said digitizing means having an adjustable gain at levels varying in steps of powers of said base and for a range as determined by low order digits of said exponent;
   second amplifier means including alternatingly operating portions for respective cascading with said first amplifier means, the second amplifier means having adjustable gain at levels varying in steps of powers of said base and for the high order digits of said exponents; and
   control means responsive to said code signal for controlling adjustment of said gain of the first amplifier means, for controlling alternation of said operating portions and for controlling the gain in the respective non-operating portion of the second amplifier means.

2. A wide range amplifier network for analog signals comprising:
   first and second amplifiers, each having individually selectable gain levels on a coarse adjustment scale;
   means for feeding the analog signal to said first and second amplifiers;
   a third amplifier having a plurality of selectable gain levels on a fine adjustment scale;
   means for providing control signals representative of a desired overall gain level;
   means responsive to particular ones of said control signals for alternatingly connecting the third amplifier in cascade with the first and second amplifiers; and
   means responsive to said control signals for selecting the gain levels of said first, second and third amplifiers in that the respective gains of said first and second amplifiers are changed only in the one thereof not connected in cascade with the third amplifier.

3. Automatic gain range control device for amplifiers comprising:
   a first amplifier having selectable gain levels apart by relatively small steps and including means for controlling the selection of the gain levels;
   second amplifier means having first and second parallel stages with different selectable gain levels apart by relatively large steps and including switching means for selectively connecting the first and the second stage in cascade to the first amplifier;
   first control means for controlling the selection of the gain level of said first amplifier in response to relatively small changes of the analog signal; and
   second control means for controlling said switching means and the selection of gains levels of said first and second stages whereby the gain level in the first or the second stage is changed only while the second or first stage is cascaded with the first amplifier.

4. In a circuit network for automatic gain range adjustment, the combination comprising:
   first and second amplifiers, each having selectable, different, interleafed gain levels, the first and second amplifiers receiving a signal to be amplified;
   circuit means for processing the signals;
   selective switching means for connecting the first or the second amplifier to said circuit means for feeding the respectively amplified signal to the circuit means; and
   means for controlling the selective switching means and the gain selection in said first and second amplifiers, to change the gain in the first or second amplifier only when disconnected from the circuit means, and to change the gain of the amplification during operation by operating the switching means to change the connection of the first and second amplifier to the circuit without changing the gain level of the first and second amplifier while operating the switching means.

5. In an amplifier network, the combination comprising:
   first, second and third amplifiers, each having stepwise adjustable gains;
   first means for adjusting the gain in the first amplifier during operation;
   second means for selectively connecting the output sides of the second and the third amplifiers to the input side of the first amplifier;
   third means for adjusting the gain in the one of the second and third amplifiers which at the time of such adjusting is not connected to the first amplifier; and
   fourth means for feeding a signal to be amplified to the input sides of the second and third amplifiers.

6. An amplifier system for preparing signals for recording, comprising:
   first means for receiving analog signals;
   a first amplifier having a plurality of selectable gain levels connected to said first means for amplifying the analog signal in accordance with the selected gain level;
   a second amplifier having a plurality of selectable gain levels for receiving and amplifying the analog signal as amplified by said first amplifier;
   a third amplifier connected to said first means and having a plurality of selectable gain levels different from the gain levels of said first amplifier; and
   gain level selector means for controlling selection of the gain levels of the second and third amplifiers, and further controlling substitution of said third amplifier for the first amplifier as signal source for the second amplifier after a gain selection in the third amplifier and during particular phases of operation.

7. An amplifier system comprising:
   a digitizer having an analog input channel and a plurality of digital output channels for digital signals of different significance, the digitizer converting an analog input signal applied to its input channel into a digital signal derivable from its output channels;
   means for providing signals representing an exponent supplementing a digital number to form a floating point number representation, the signals as provided having different numerical significance along a scale and include a first and a second plurality of signals, in the order of significance, a signal pertaining to the first plurality being followed by a signal of the second plurality and vice versa;
   a first and a second amplifier, each receiving an analog signal;
   means for connecting one of said first and second amplifiers to said analog input channel of said digitizer and including means for alternating the connection in response to the first plurality of said signals; and
   means responsive to the second plurality of signals to change the gain in the first or second amplifier disconnected from said analog input channel.

8. In an amplifier system of the character described:
first and second cascaded amplifiers for said signals having selectable fine and coarse gain levels respectively on a gain level scale, the second cascaded amplifier including two amplifier stages, only one thereof or the other being connected to the first amplifier to form the cascade at any instant;

first means for monitoring whether the signal as amplified exceeds a first level;

second means for monitoring whether the signal as amplified drops below a second level;

gain level selector means for providing signals representative of gain levels and being connected to said first and second means for changing the gain level as provided in response to the first means in downward direction, and for changing the gain level as provided in response to the second means in upward direction, one of the changes as induced by response of the first or second means occurring only when the respective response persists for a predetermined period of time while the respective other gain change in response to the respective other one of the first and second means occurs faster; and control means adjusting the gain levels in said amplifiers in response to the gain as provided by said gain level selector and connected to change the gain within the second amplifier only in the respective disconnected one of the two stages.

9. An amplifier system for seismic signals, comprising:

amplifier means for receiving the analog-type seismic signal and providing a digital signal, the amplifier system including a first gain adjustable amplifier and second gain adjustable amplifier stages for selective cascading with the first amplifier; and means responsive to the amplitude of the seismic signal as passing through the amplifier system to change the gain of the amplifier system by changing the gain of the first amplifier and by changing selective cascading of said second amplifier stages while changing the gain in a respective disconnected one of said second amplifier stages, the gain of the amplifier system being changed by levels in which adjacent levels differ by a factor of $2^n$, with $n$ being substantially a positive integer.

10. An amplifier for seismic signals, comprising:

an amplifier system for receiving an analog-type seismic signal varying over a wide db range, and providing a digital signal representative of the seismic signal as received within a limited range, the amplifier system including gain adjustable amplifier stages selectively connected into the amplifier system for passage and amplification of the seismic signal; and means responsive to the amplitude of the seismic signal as passing through the amplifier system to change the gain of the amplifier system and including means for changing the selective connection of said stages and for changing the gain in a respective disconnected one of said stages.

11. An amplifier for seismic signals, comprising:

an amplifier system for receiving an analog-type seismic signal varying over a wide db range, and providing a digital signal, the amplifier system having a plurality of gain levels in which adjacent levels differ by a factor of $2^n$, with $n$ being substantially a positive integer and including gain adjustable amplifier stages selectively connected into the amplifier system for passage and amplification of the seismic signal; and means responsive to deviations of the seismic signal as passing through the amplifier system and as corresponding to deviations of the digital signal from a range which is defined by a db range corresponding to two adjacent gain levels, to change the gain of the amplifier system which includes means for changing the selective connection of said stages and for changing the gain in a respective disconnected one of said stages.

12. An amplifier system for seismic signals, comprising:

amplifier means for receiving analog-type seismic signals varying over a wide db range, and providing a digital signal, the amplifier means including first and second amplifier stages selectively connected into the amplifier means for passage and amplification of the seismic signal, the first and second stages each having several selectable gain levels, the gain levels in the first stage being different from the gain levels in the second stages; and means responsive to the amplitude of the seismic signal as passing through the amplifier to change the gain of the amplifier system and including means for changing the selective connection of said first and second stages for operation in said system and for changing the gain in the respective disconnected one of said first and second stages.

13. An amplifier system, comprising:

digitizer means for resolving an analog input voltage having a value between $a$ and $b$ into digital output signals representing specific numbers between $c$ and $d$;

scaling means for transforming an external analog voltage into an analog input voltage between $a$ and $b$ and generating digital signals between $e$ and $f$ representing the scale factor necessary to accomplish the transformation;

said scaling means including amplifier means having first and second parallel stages with different selectable gain levels apart by relatively large steps switching means for selectively connecting the first and second stage to amplify said external analog signal and for changing the gain level of the amplifier not amplifying said signal; and means responsive to the digital output of the digitizer means for controlling the scaling means so as to keep the digitizer analog input voltage substantially within the voltage range between $a$ and $b$.

14. An amplifier systems, comprising:

digitizer means for resolving an analog input voltage having a value between $a$ and $b$ into digital output signals representing specific numbers between $c$ and $d$;

scaling means for transforming an external analog voltage into an analog input voltage between $a$ and $b$ and generating digital signals between $e$ and $f$ representing the scale factor necessary to accomplish the transformation;

said scaling means including first amplifier means having first and second parallel stages with different selectable gain levels apart by relatively large steps, and including switching means for selectively connecting the first and second stage to amplify said external analog signal and for changing the gain level of the amplifier not amplifying said signal and second amplifier means in cascade with said first amplifier means; and means responsive to the digital output of the digitizer means to controlling the scaling means so as to keep the digitizer analog input voltage substantially within the voltage range between $a$ and $b$.

15. The system of claim 14 including a plurality of selectable gain levels in said second amplifier and means responsive to said switching means for selection among said gain levels.

References Cited

UNITED STATES PATENTS 3,308,392    3/1967    McCarter _____ 330—144

ROY LAKE, Primary Examiner

J. B. MULLINS, Assistant Examiner

U.S. Cl. X.R.

330—86, 110, 124, 137, 138; 340—15.5